US011201844B2

(12) United States Patent
Kwatra et al.

(10) Patent No.: US 11,201,844 B2
(45) Date of Patent: Dec. 14, 2021

(54) METHODS AND SYSTEMS FOR MANAGING MULTIPLE TOPIC ELECTRONIC COMMUNICATIONS

(71) Applicant: INTERNATIONAL BUSINESS MACHINES CORPORATION, Armonk, NY (US)

(72) Inventors: Shikhar Kwatra, Durham, NC (US); Sarbajit K. Rakshit, Kolkata (IN); John D. Wilson, League City, TX (US); Paul Krystek, Highland, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 87 days.

(21) Appl. No.: 16/116,884

(22) Filed: Aug. 29, 2018

(65) Prior Publication Data
US 2020/0076759 A1    Mar. 5, 2020

(51) Int. Cl.
*G06F 15/16*    (2006.01)
*H04L 12/58*    (2006.01)
*G06F 3/0482*    (2013.01)

(52) U.S. Cl.
CPC ............ *H04L 51/22* (2013.01); *G06F 3/0482* (2013.01); *H04L 51/16* (2013.01); *H04L 51/32* (2013.01)

(58) Field of Classification Search
CPC ......... H04L 51/22; H04L 51/16; H04L 51/32; G06F 3/0482
USPC ...................................................... 709/206
See application file for complete search history.

(56) References Cited

U.S. PATENT DOCUMENTS

| | | | |
|---|---|---|---|
| 7,899,871 B1* | 3/2011 | Kumar | H04L 51/16 709/206 |
| 8,201,095 B2 | 6/2012 | Dewar et al. | |
| 9,710,792 B2* | 7/2017 | Bhamidipaty | G06Q 10/107 |
| 2009/0150495 A1* | 6/2009 | Sun | G06Q 10/107 709/206 |
| 2011/0153595 A1* | 6/2011 | Bernstein | G06Q 10/107 707/722 |
| 2014/0089814 A1 | 3/2014 | Yu et al. | |
| 2014/0344718 A1 | 11/2014 | Rapaport et al. | |
| 2015/0248222 A1* | 9/2015 | Stickler | G06Q 10/06 715/763 |
| 2016/0217408 A1* | 7/2016 | Garrity | G06Q 10/063 |
| 2016/0337281 A1* | 11/2016 | Breedvelt-Schouten | H04L 51/063 |
| 2018/0356952 A1* | 12/2018 | Boothroyd | H04L 51/16 |

OTHER PUBLICATIONS

Strassel, "Topic Detection and Tracking Annotation Guidelines," TDT4 Guidelines, Version 1.5, Apr. 5, 2005 (31 pages).

(Continued)

*Primary Examiner* — Suraj M Joshi
*Assistant Examiner* — Ayele F Woldemariam
(74) *Attorney, Agent, or Firm* — Griffiths & Seaton PLLC

(57) ABSTRACT

Embodiments for managing electronic communications by one or more processors are described. A plurality of electronic messages are received. Each of the plurality of electronic messages is associated with a respective one of a plurality of topics. A portion of the plurality of topics is selected. A signal representative of the plurality of electronic messages that are associated with the selected portion of the plurality of topics is generated.

9 Claims, 10 Drawing Sheets

(56) References Cited

OTHER PUBLICATIONS

Anonymous, "Method for Filtering Instant Messaging by Topic and Contextual Attributes," An IP.com Prior Art Database Technical Disclosure, IPCOM000208899D, Jul. 22, 2011 (5 pages).
Lynch et al., "Conversation Room Topic Adherance," An IP.com Prior Art Database Technical Disclosure, IPCOM000242967D, Sep. 3, 2015 (6 pages).
Anonymous, "Actionable Insights on Incomplete Discussion Form Multiparty Conversation," An IP.com Prior Art Database Technical Disclosure, IPCOM000249572D, Mar. 3, 2017 (3 pages).
Anonymous, "Cognitive meeting assist mechanism," An IP.com Prior Art Database Technical Disclosure, IPCOM000253595D, Apr. 13, 2018 (4 pages).

* cited by examiner

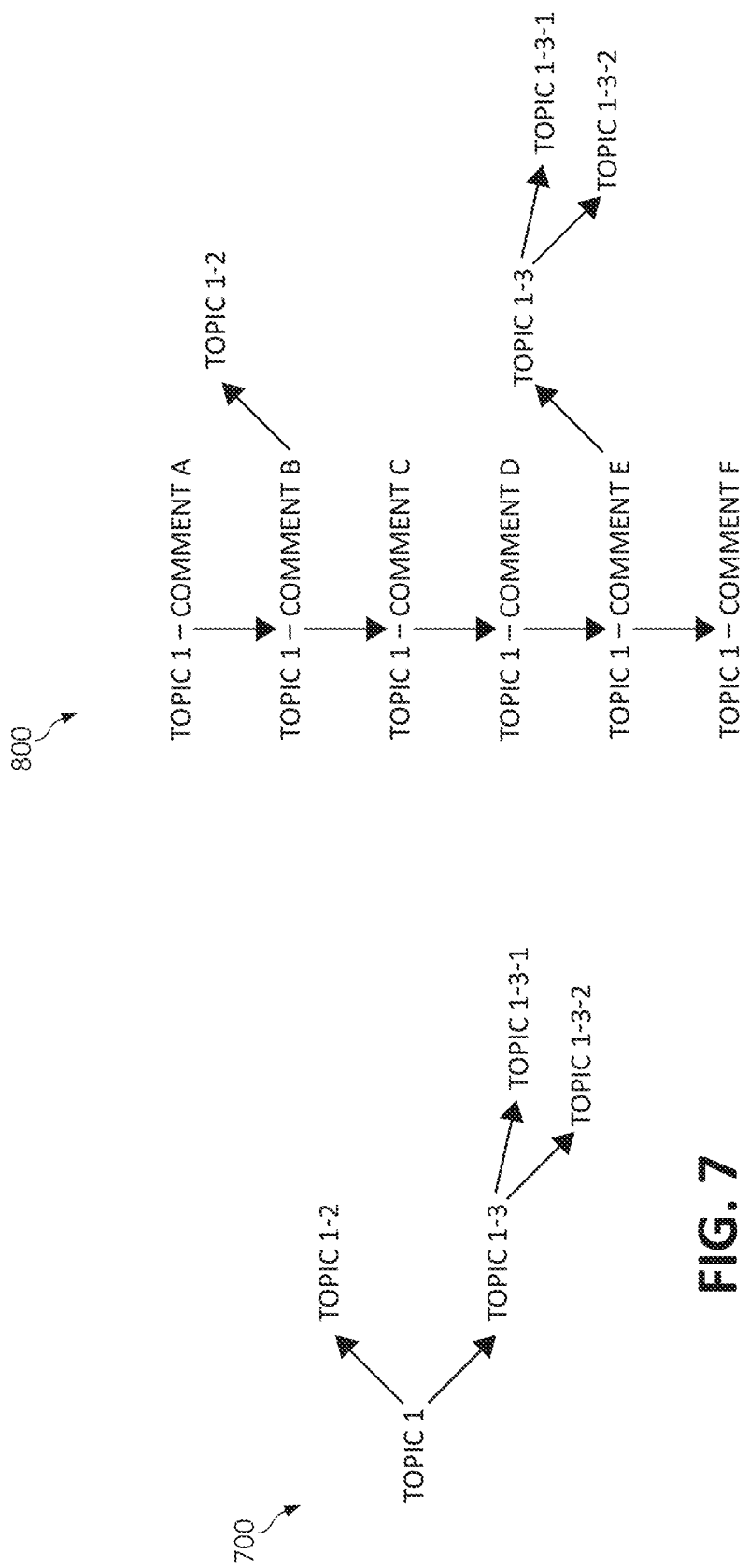

METHODS AND SYSTEMS FOR MANAGING MULTIPLE TOPIC ELECTRONIC COMMUNICATIONS

BACKGROUND OF THE INVENTION

Field of the Invention

The present invention relates in general to computing systems, and more particularly, to various embodiments for managing multiple topic electronic communications.

Description of the Related Art

Various forms of electronic communications or messaging, such as text messaging, emails, messaging applications, etc., may be set up in such a way that multiple users can simultaneously take part in conversations or discussions. In such instances, it is often the case that the various messages posted (or created) by the users cover (or are associated with) multiple topics or subjects. For example, in a "group chat" with dozens of users "present" (e.g., logged in, receiving/able to post comments/messages, etc.), five of the users may be posting messages related to a social issue, ten of the users may be discussing a technological topic, and the remaining users may be unavailable to comment (e.g., they are not actively following the chat) or simply not posting any comments (or messages).

In situations such as this, users who are trying to focus on particular topics may find the other comments (i.e., those related to other topics) distracting, which may make it more difficult for them to follow and/or take part in the discussion(s) of interest.

SUMMARY OF THE INVENTION

Various embodiments for managing electronic communications by one or more processors are described. In one embodiment, by way of example only, a method for managing electronic communications, again by one or more processors, is provided. A plurality of electronic messages are received. Each of the plurality of electronic messages is associated with a respective one of a plurality of topics. A portion of the plurality of topics is selected. A signal representative of the plurality of electronic messages that are associated with the selected portion of the plurality of topics is generated.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIGS. 7 and 8 are plan views of visual representations of topics associated with group communications according to embodiments of the present invention;

DETAILED DESCRIPTION OF THE DRAWINGS

Figure 1:
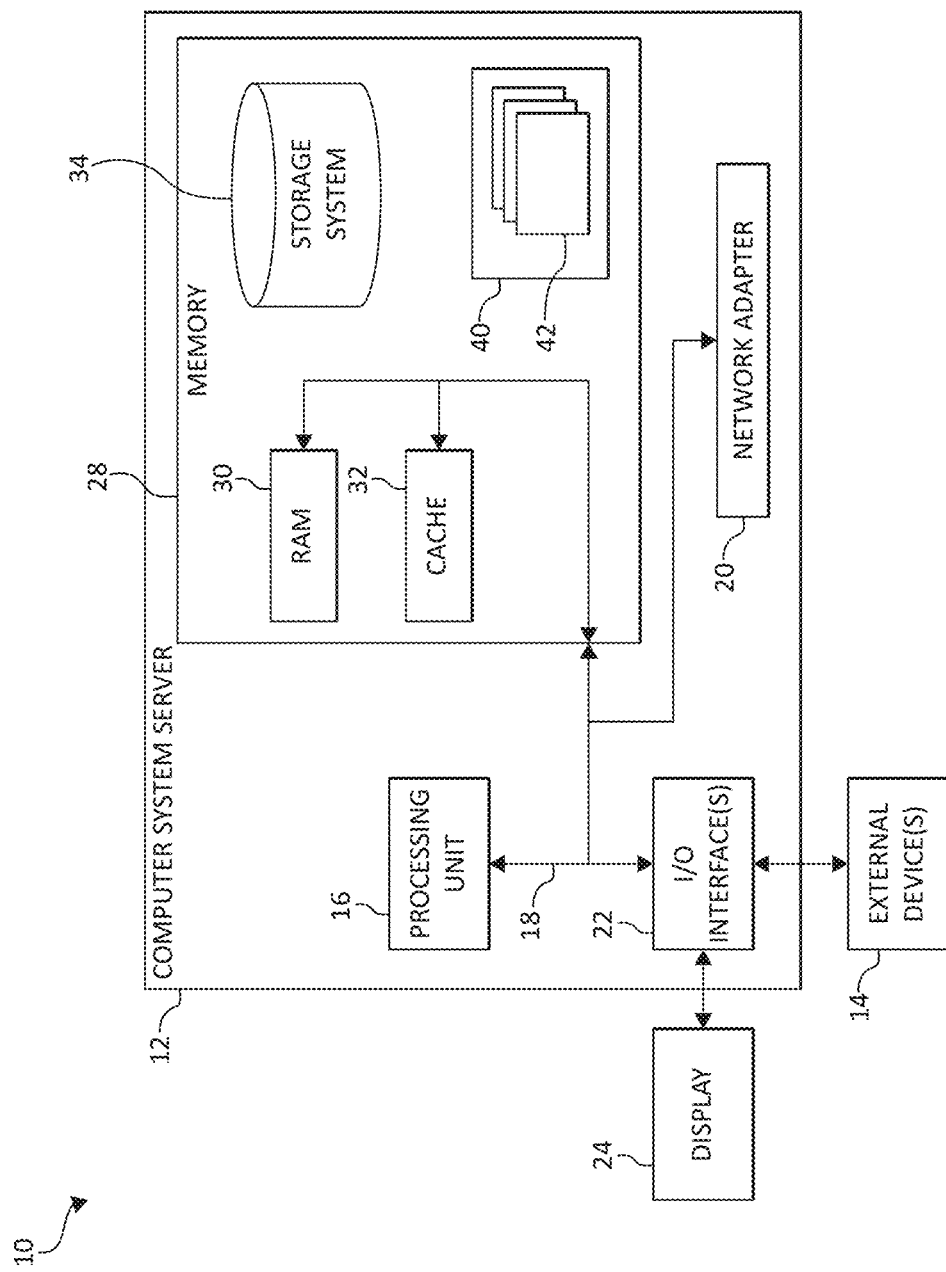
FIG. 1 is a block diagram depicting an exemplary computing node according to an embodiment of the present invention.

As discussed above, various forms of electronic communications or messaging, such as text messaging, emails, messaging applications, etc., may be set up in such a way that multiple users can simultaneously take part in conversations or discussions. In such instances, it is often the case that the various messages posted (or created or sent) by the users cover (or are associated with) multiple topics or subjects. For example, in a "group chat" with dozens of users "present" (e.g., logged in, receiving/able to post comments/messages, etc.), five of the users may be posting messages related to a social issue, ten of the users may be discussing a technological topic, and the remaining users may be unavailable to comment (e.g., they are not actively following the chat) or simply not posting any comments (or messages).

In situations such as this, users who are trying to focus on particular topics may find the other comments (i.e., those related to other topics) distracting. That is, in order for the users to follow the topic (or topics) they desire, they may have to read all of the comments or messages that are posted, including those that are irrelevant to that topic. As such, the users may find it difficult to follow and/or take part in the discussion(s) of interest and/or doing so may take considerably more time than desirable.

In view of the foregoing, a need exists for methods and systems that allow for electronic communications or messages, such as those sent via text messaging, messaging applications, emails, etc., to be filtered with respect to, for example, the topic(s) associated with the messages. It should be noted that the embodiments described herein may be applied to not only text-based communications, such as text messages, emails, etc. but also audio and/or video communications, such as voicemail messages, video clips, etc.

To address these needs, embodiments described herein provide methods and systems that allow, for example, the rendering of received electronic messages (or communications, comments, etc.) to be performed in such a way that only those of the received messages that are associated with (or related to) particular topics to be displayed and/or those associated with particular topics to be rendered (or displayed) in a manner different than the messages that are not associated with those topics. The methods and systems described herein may facilitate the ability of the user(s) to follow, take part in, and/or stay focused on the desired (or selected) topic(s).

In some embodiments, the selected topic(s) (and/or the selection of comments/messages) is based on a selection made by the user, the user's interests, the cognitive heuristics (e.g., a cognitive profile) of the user, and/or contextual situation. In one example, when the selection of the topic is made, the messages that are determined to be associated with the selected topic(s) are rendered (e.g., displayed by the user's computing device) while the other messages (e.g., associated with other topics) are not rendered. In some embodiments, the user may be provided with an option to view at least some of the other messages at a later time (e.g., depending on the relevance of the other topics/messages). In addition, in some embodiments, cognitive learning (or a cognitive analysis) may be utilized to, for example, assist the user in monitoring the conversation (e.g., posted comments, messages, etc.) to help the user identify messages that may be of interest to them (e.g., perhaps related to other topics).

As such, in some embodiments, a cognitive analysis may be used to generate a profile for the user(s) (e.g., based on various sources of data associated with the user(s)), associate comments/messages with topics, determine which topics and/or associated comments are relatively relevant to the user(s), and/or determine a relevancy score or grade for different topics and/or comments. Data sources that be use used to generate a cognitive profile for the user(s) may include any appropriate data sources associated with the user that are accessible by the system (perhaps with the permission or authorization of the user). Examples of such data sources include, but are not limited to, a profile of (or basic information about) the user (e.g., job title, place of work, length of time at current position, family role, etc.), a schedule or calendar (i.e., the items listed thereon, time frames, etc.), projects (e.g., past, current, or future work-related projects), electronic communications (e.g., email, text messages, etc.), social media activity (e.g., posts, reactions, comments, groups, etc.), browsing history (e.g., web pages visited), and online purchases.

The cognitive analysis may include classifying natural language, analyzing tone, and analyzing sentiment (e.g., scanning for keywords, key phrases, etc.) with respect to, for example, the data sources associated with the user(s) and/or the content (e.g., topics, comments, messages, etc). Over time, the methods and systems described herein may determine correlations (or insights) that allow for an improvement in the determining of the relevancy or importance of topics and/or comments for users, perhaps with feedback provided by the users, that allows for the performance of the system to improve with continued use.

As such, in some embodiments, the methods and/or systems described herein may utilize a "cognitive analysis," "cognitive system," "machine learning," "cognitive modeling," "predictive analytics," and/or "data analytics," as is commonly understood by one skilled in the art. Generally, these processes may include, for example, receiving and/or retrieving multiple sets of inputs, and the associated outputs, of one or more systems and processing the data (e.g., using a computing system and/or processor) to generate or extract models, rules, etc. that correspond to, govern, and/or estimate the operation of the system(s), or with respect to the embodiments described herein, the association of messages with topics and the importance (or relevancy) of the messages for users. Utilizing the models, the performance (or operation) of the system (e.g., utilizing/based on new inputs) may be predicted and/or the performance of the system may be optimized by investigating how changes in the input(s) effect the output(s).

In particular, in some embodiments, a method for managing electronic communications by one or more processors is provided. A plurality of electronic messages are received. Each of the plurality of electronic messages is associated with a respective one of a plurality of topics. A portion of the plurality of topics is selected. A signal representative of the plurality of electronic messages that are associated with the selected portion of the plurality of topics is generated.

Only those of the plurality of the electronic messages that are associated with the selected portion of the plurality of topics may be caused to be rendered. The plurality of electronic messages may be caused to be rendered. The rendering of the plurality of electronic messages may include rendering the plurality of electronic messages that are associated with the selected portion of the plurality of topics in a manner different than the others of the plurality of electronic messages.

User input indicative of filtering the plurality of electronic messages may be received. At least one of the selecting of the portion of the plurality of topics and the generating of the signal representative of the plurality of electronic messages that are associated with the selected portion of the plurality of topics may be performed in response to the receiving of the user input. At least one of the selecting of the portion of the plurality of topics and the generating of the signal representative of the plurality of electronic messages that are associated with the selected portion of the plurality of topics may be performed based on at least one data source associated with a user.

A list of at least some of the plurality of topics may be caused to be rendered. The selected portion of the plurality of topics may include only one of the plurality of topics.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of implementing and/or performing (or causing or enabling) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, mobile electronic devices (e.g., mobile phones, PDAs, laptop devices, etc.), network PCs, and servers. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
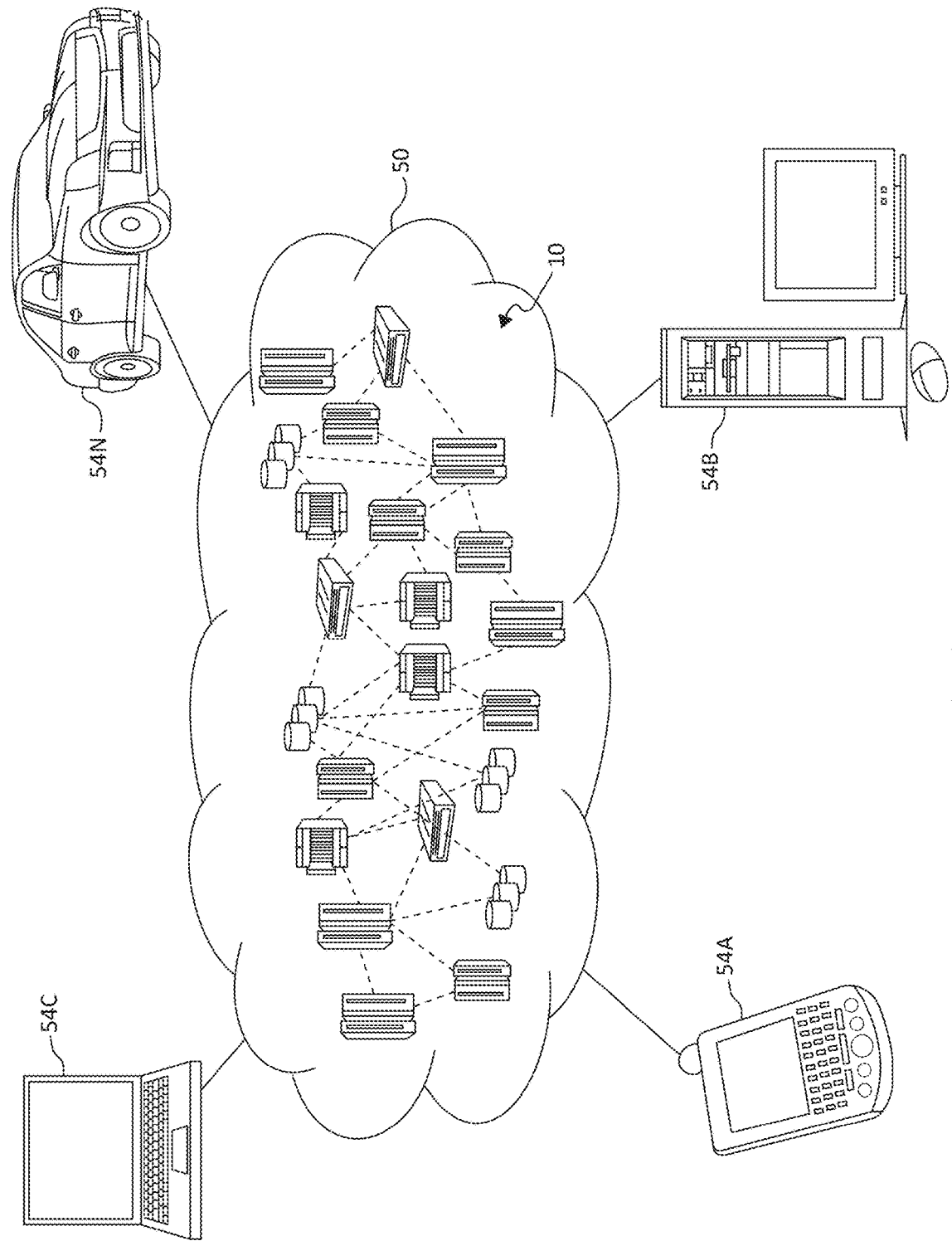
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
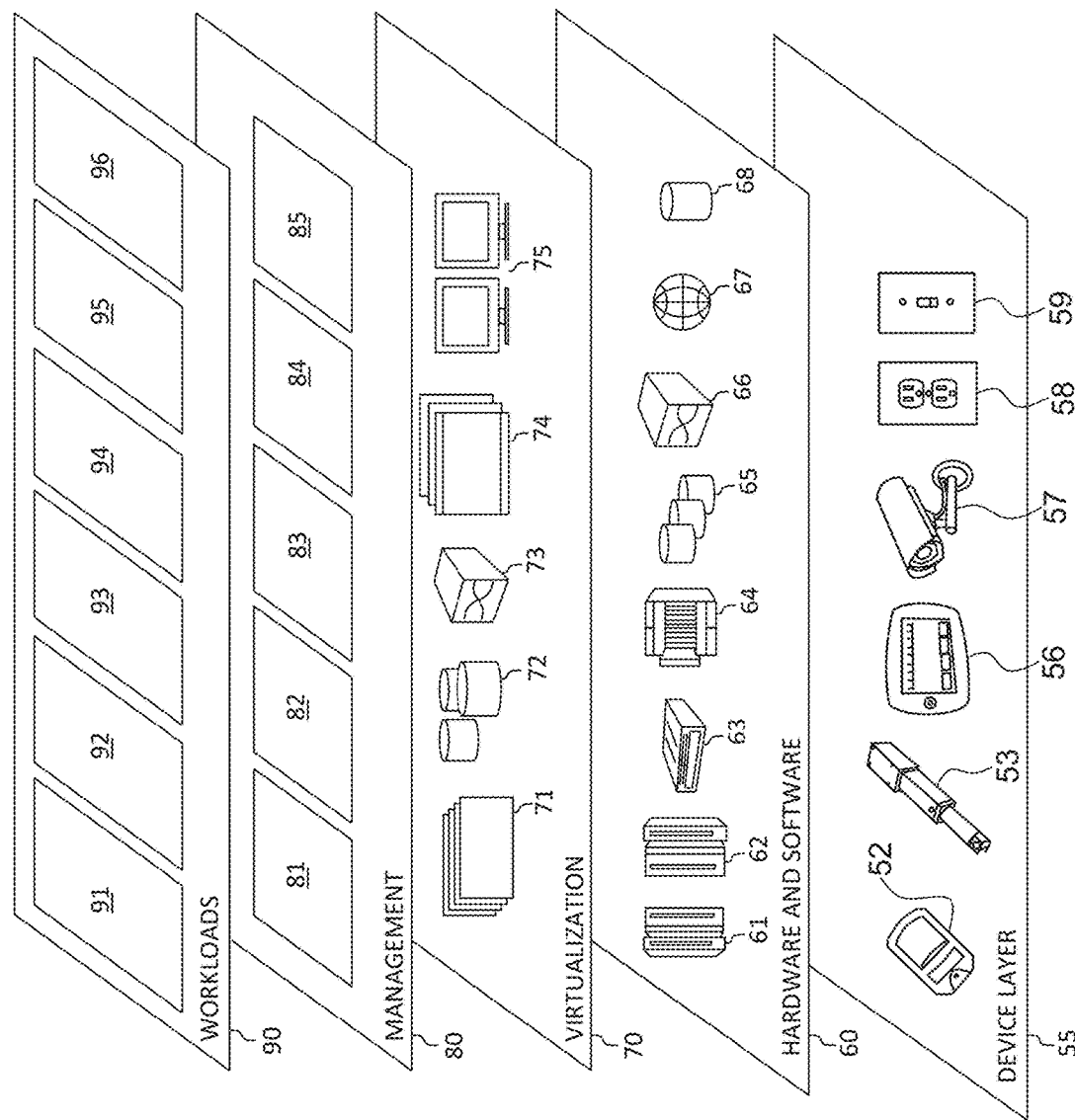
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for managing electronic communications as described herein. One of ordinary skill in the art will appreciate that the workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the methods and systems of the illustrated embodiments provide novel approaches for managing electronic communications, such as messages sent via text messaging, messaging applications, email, etc, sent in environments that include multiple (e.g., more than two) users (e.g., a multiple party communication group). In some embodiments, the methods and system provide dynamic encapsulation, prioritization, and grouping/framing of conversational instances (e.g., comments, messages, etc.) based on, for example, the particular user's cognitive heuristics, personalized interests, and/or contextual situation.

In some embodiments, while engaged in a multiple party real-time communication group (e.g., group text, via a messaging application, via a messaging extension on a web browser and/or a website, etc.), a user may enable a "reduced topic" (e.g., "one topic at a time") functionality (e.g., with respect to his/her respective computing device or node). Accordingly, in such embodiments, a contextual analysis engine may filter out (e.g., block) messages that are not associated with (or divert from) a selected topic (or subject) and/or render such messages differently (e.g., render the messages associated with the selected topic(s) differently than the messages that are not associated with the selected topic(s)). As a result, the user may be able to continue to discuss the particular topic without getting diverted or distracted by unrelated messages.

For example, consider a electronic communication group (e.g., a group text) that includes ten users, with the primary topic of conversation being related to a New Year's Eve party. At some point in the conversation, one of the users posts a joke, and other users begin commenting on or reacting to the joke. The joke and the related messages may be distracting for users who are trying to focus on the discussion related to the New Year's Eve party. Using the methods and systems described herein, the users (or at least one of the users) may enable the reduced topic functionality described herein, which may prevent the message that includes the joke and/or any messages related to the joke from being rendered (e.g., on a display device of their respective computing device or node).

In some embodiments, the system may be "self-learning" (e.g., using a cognitive analysis) and may be able to identify the conditions under which the user(s) enable the reduced topic functionality. A monitoring engine may consider, for example, the user's interests (e.g., based on data sources associated with the user), level of involvement (e.g., messages posted related to a particular topic), the seriousness of the topic, biometric information, surrounding context, involvement of multiple people, and/or social media information, etc. In such embodiments, the system may be able to automatically enable the reduced (or single) topic functionality for any appropriate context. For example, with respect to the example of the conversation related to a New Year's Eve party described above, if one of the topics of discussion is determined to be related to planning the event, and the user is deeply involved (e.g., commenting frequently on the topic), the reduced topic functionality may be automatically enabled.

In some embodiments, using, for example, a cognitive analysis, the system may generate notifications if messages related to another topic that is determined to be relatively important are detected in the conversation. For example, again referring to the conversation related to the New Year's Eve party, if the reduced topic functionality has already been enabled (e.g., so that only messages related to the planning of the party are rendered by the user's computing node), and messages related to another topic that is determined to be of possible interest to the user, such as changes in a tax policy, are detected, the user may be notified (e.g., via a pop-up window or specifically generated message in the group discussion) of such. For example, the user may be provided with a generalized notification indicating that other important topics are being discussed and given the option to disable the reduced topic functionality or provided with a specific notification indicating the new topic and giving the option to cause the messages related to the new topic to be rendered. As such, the user may be able to add to the list of topics for which the associated messages are being rendered.

In some embodiments, if the system determines that the discussion regarding the selected topic (i.e., after the reduced topic functionality has been enabled) has ended by, for example, determining that messages related to that topic are no longer being posted, the user may be shown at least some of the messages that are associated with other topics. As such, the user may then be able to view the messages that were previously missed (e.g., filtered out, prevented from being rendered, etc.) and accordingly read, react, and/or respond to such messages. For example, regarding the conversation regarding the New Year's Eve party described above, if the system determines that the discussion regarding the party has ended, messages related to other topics, such as the joke and associated comments, may then be rendered on the user's computing device or node.

In some embodiments, the methods and systems described herein may utilize the features described below. As mentioned above, the methods and systems described herein may be implemented using any suitable computing system, device, or node (e.g., a computing device and/or a software application installed thereon), perhaps utilizing a cognitive model (or cognitive analysis).

In some embodiments, a real-time communication server may identify what topics of discussion are in progress in any communication group (e.g., group text, email chain, etc.). When any content (e.g., a message, communication, email, etc.) is received (or submitted), the server may determine if there is any contextual relationship between the received content and any previously received content. A contextual analysis engine may identify the topic of any content received by (or submitted to) the communication group. When content is posted, the contextual analysis engine may assign a tag (or other identifier) based on the topic of discussion. In some embodiments, the system may receive and consider user feedback regarding content when the content is posted, which may be used to, for example, tag the content (or determine which topic should be associated with the content).

In some embodiments, the methods and systems described herein utilize a data processing engine. Contextual and interest based information may be stored in a database (e.g., on the cloud) associated with the user. The data processing engine may utilize unstructured data retrieved (or received) from different data sources and perform unsupervised learning, such as k-means clustering, as is commonly understood, to categorize the data, thereby aligning repetitive data and habits for accuracy and conformity. As such, related associated activities and content followed by the user may be categorized within one objective output set with the respective information (or keywords, highlights, etc. of the activity). For example, the gathered data may be analyzed to identify keywords, which may then be categorized by name of person, name of food, name of a activity, name of a place, etc. Such information may be stored (e.g., in the database). Multiple examples of such relationships may be created and stored (e.g., in user's device, on the database, etc.).

In some embodiments, the unstructured data may be assigned weights (e.g., configurable weights) based on the activity performed by the user. The repetitiveness of the appearance of topics in a similar domain (e.g., similarity of topics, messages, etc.) may be used to prioritize the content and adjust the weights associated with that activity and/or content. The social aspects associated with the content may be annexed or combined in a conglomerate form with the activity. Other relevant data associated with the content may be fetched from online sources (e.g., online sources that may be used to rank the priority of the content) in order to classify the data in a structured format. In such embodiments, the structured data may classified using, for example, supervised machine learning algorithms, including multi-level neural network classification or logistic regression with regularization.

Figure 4:
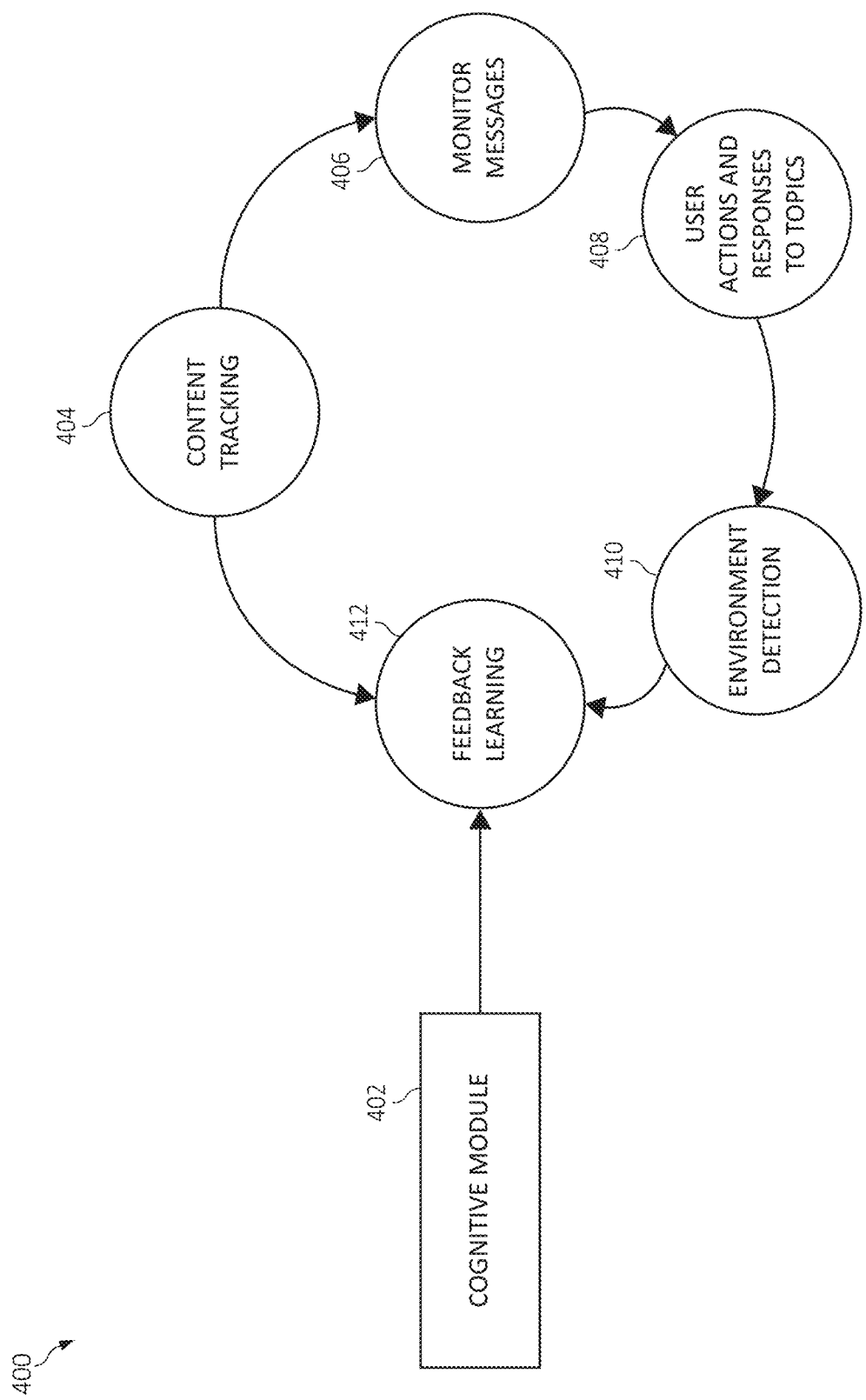
FIGS. 4 and 5 are functional/block diagram of a system in which various aspects of embodiments of the present invention may be implemented.

FIG. 4 illustrates a system 400 according to some embodiments of the present invention. In some embodiments, the system 400 may be used to (at least) provide an initial configuration (e.g., initial content parameters) for the management of electronic communications described herein. The system 400 includes a cognitive module 402, which may be implemented using any suitable computing system, device, or node, such as those described above. The cognitive module 402 may perform and/or receive data related to content tracking 402, monitor messages 404, user actions and responses to topics 406, environment detection 408, and feedback learning 410. Content tracking 402 may refer to the detection and tracking of the content of received messages (e.g., the topics associated therewith). Monitor(ing) messages 404 may refer to the detection of the submission or receipt of messages and which user(s) send or generate the messages. User actions/responses 406 may refer to the particular user's actions, such as generating messages, in response to other messages, including the frequency and/or timing thereof. Environment (or environmental) detection 408 may refer to the detection of any data associated with the user's environment, such as the user's location, proximity to other users, weather conditions, etc. Feedback learning 410 may refer to the use of feedback provided by the user with respect to, for example, the accuracy of previous uses of the reduced topic functionality, as described above.

Figure 5:
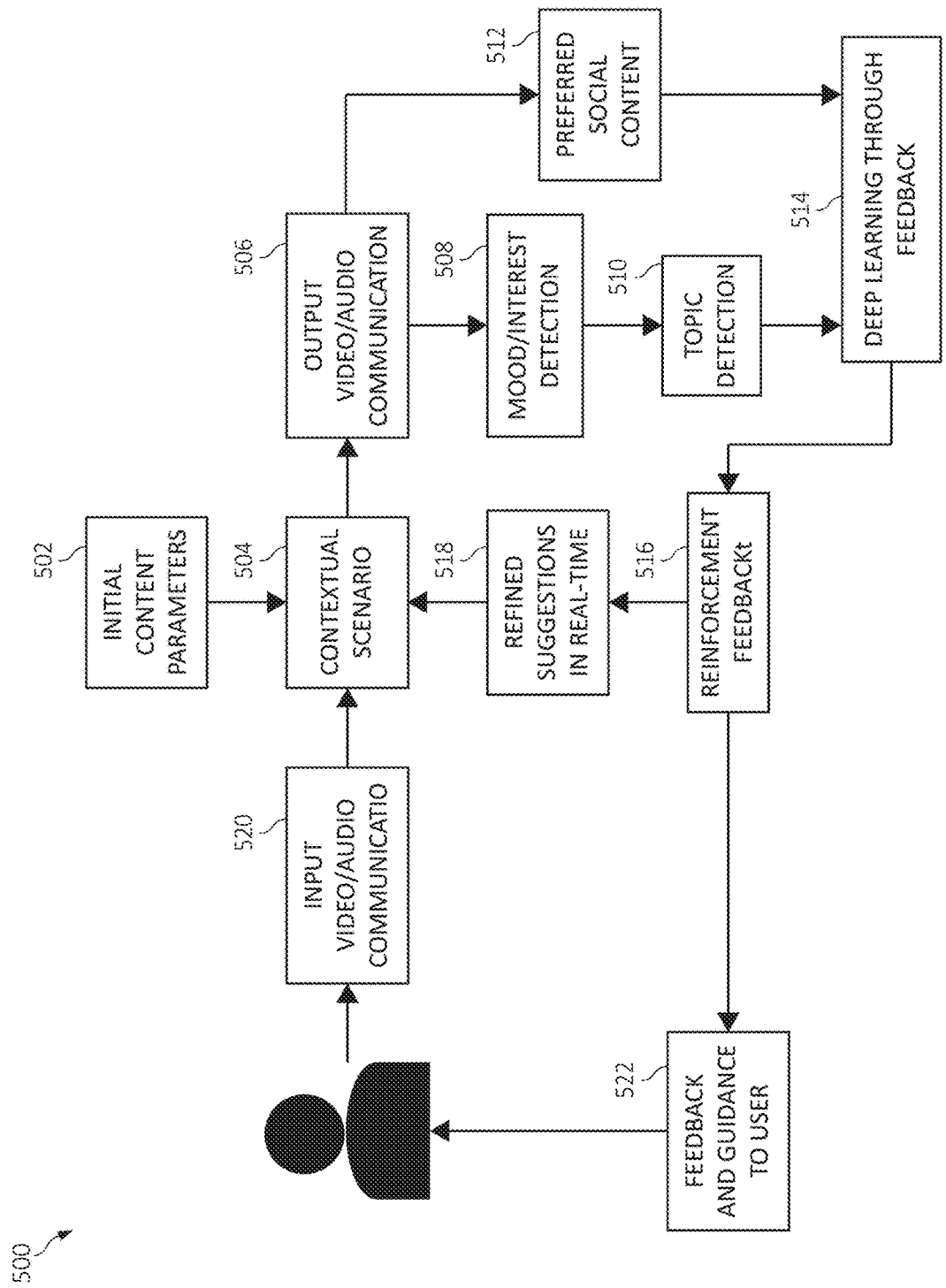

FIG. 5 illustrates a system 500 according to some embodiments of the present invention. In some embodiments, the system 500 includes (and/or utilizes) a dynamic parameter configuration and mood detection, such as based on mel-frequency cepstrum coefficients (MFCCs) and natural language processing (NLP), which may be used as inputs for a cognitive system (or deep learning network or neural network model), and provide active feedback to the user based on dynamic preferences determined by the system. In the depicted environment, the system 500 includes (and/or utilizes and/or provides) initial content parameters 502, contextual scenario 504, output (e.g., text, video, and/or audio) communications (e.g., messages received from other users) 506, mood/interest detection 508, topic detection 510, preferred social content 512, deep learning through feedback 514, reinforcement feedback 516, refined suggestions in real-time 518, input (e.g., text, video, and/or audio) communications (e.g., messages generated/sent by the user) 520, and feedback and guidance to the user 522.

Using such, in any multiple party (or multi-member) communication group, if the user enables the reduced topic (e.g., "one topic at a time") functionality (and/or the functionality is automatically enabled), the system may generate a topic tag for any communications (e.g., messages) received by the group. When content (e.g., messages) are received, the system may determine whether or not the reduced topic functionality has been enabled and determine which topic(s) has been selected. If the reduced topic functionality has been enabled, a signal representative of the messages that are associated with the selected topic(s) may be generated. The signal may cause (or be used such that) only the messages that are associated with the selected topic(s) to be rendered by or on the respective user's computing node (e.g., computing device, messaging application, etc.) and/or the messages that are associated with the selected topic(s) to be rendered in a manner different than the messages that are not associated with the selected topic(s).

Figure 6:
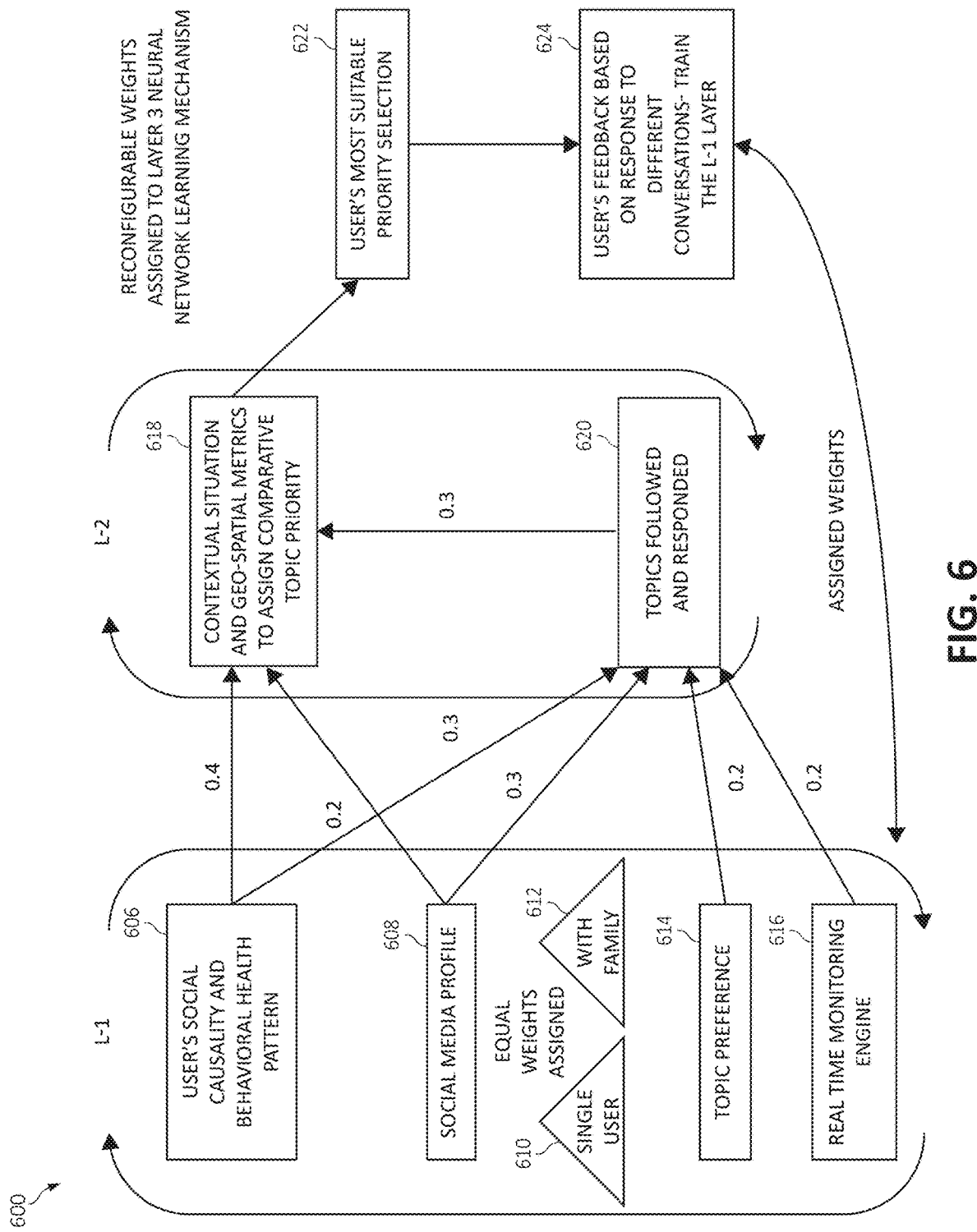
FIG. 6 is a diagram of a classification model according to an embodiment of the present invention.

FIG. 6 illustrates a multi-level neural network classification model 600 according to some embodiments described herein. The model 600 may, for example, proactively obtain user feedback and social media information to prioritize and/or encapsulate topics based on the cognitive heuristics (or a cognitive profile) of the user. The model includes a first layer (L-1) 602 and a second layer (L-2) 604. The first layer 602 includes (and/or utilizes) the user's social causality and behavioral factors (e.g., social media factors/activity and previous conversations, messages, etc.) 606, the user's social media profile 608 (e.g., based on the user's individual profile 610 and family/friends' profiles 612), topic preferences (e.g., manually selected) 614, and a real-time monitoring engine 616. The second layer includes (and/or utilizes) contextual situation and geo-spatial metrics 618 to assign comparative topic priority based on, for example, the user's social causality 606 and social media profile 608, as well as topic followed and responded to 620 based on, for example, the user's social causality 606, social media profile 608, topic preferences 614, and the real-time monitoring engine 616, which are used for comparative topic priority. From the contextual situation and geo-spatial metrics 618, the user's most suitable priority selection (of topics) 622 is generated, and the user's feedback is received 624 (i.e., within a third layer of the model 600), to train the first layer 602. The various factors utilized by the model 600 may be assigned configurable weights to tune the selection of topics.

In some embodiments, the system may determine the conditions under which the user typically (or often) enables the reduced topic functionality (and/or content tagging functionality). In such embodiments, when similar conditions are detected, the system may automatically enable the reduced topic functionality.

In some embodiments, if the reduced topic functionality has already been enabled and the system detects that another topic that may be of interest to the user is being discussed (e.g., multiple messages related to the other topic have been received in the group communication), a notification may be provided to the user, and the user may be able to select whether or not to join in that portion of the conversation (e.g., have those messages rendered). The user's response(s) in this regard (e.g., whether or not to expand the messages rendered to include the additional topic(s)) may be used by the system as feedback (e.g., to reconfigure weights, build cognitive history/profile, etc.). Also, in some embodiments, if the reduced topic functionality has been enabled, and the system detects that the conversation related to the select topic(s) has ended, the reduced topic functionality may be disabled or adjusted, allowing additional messages, topics, etc. to be rendered.

Further, in some embodiments, a "mapping" of messages and/or associated topics may be generated and perhaps rendered for the user. For example, if the reduced topic functionality has been enabled, and only the comments associated with one selected topic are being rendered for the user, comments associated with "child" topics of the selected topic (e.g., topics related to and/or "spawned by" the selected topic) may be filtered out. In such instances, when the discussion regarding the original, selected topic has been completed, a mapping (or visual representation or data structure) of the related topics (or of all topics) and/or the associated comments may be provided. Examples of such visual representations are shown in FIGS. 7 and 8. In particular, FIG. 7 illustrates a relatively simple mapping 700 of various topics. The mapping 700 may be rendered by the user's computing device or node, and the user may be able to select particular topics (or sub-topics), such as via a cursor, mouse, touchscreen, etc., and thus be able to view messages associated with those topics. FIG. 8 illustrates a more detailed mapping 800, which includes the comments from which the new topics originated.

Figure 9:
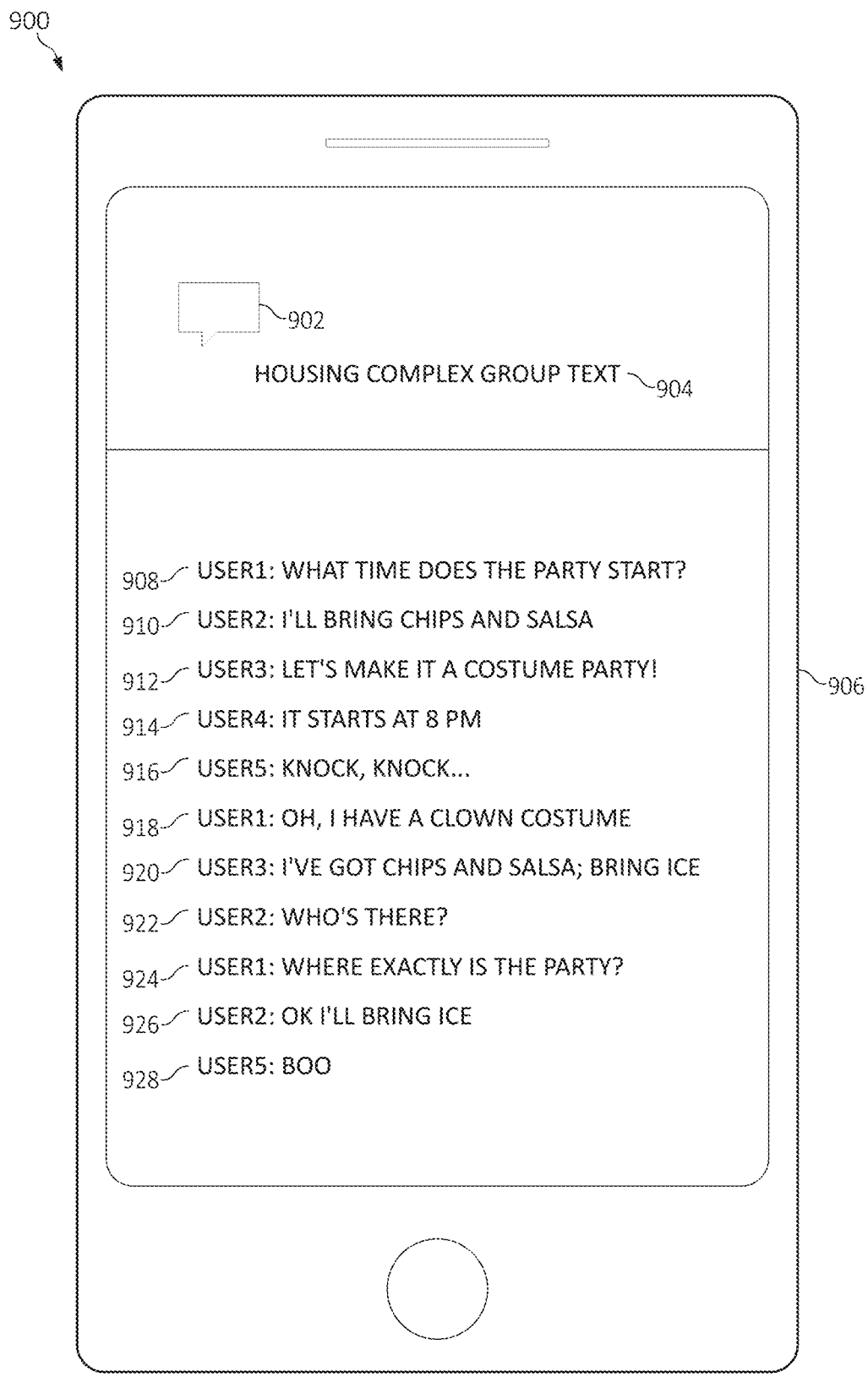
FIGS. 9 and 10 are plan views of messaging group communication messaging windows according to embodiments of the present invention.

Referring now to FIG. 9, a chat (or communication group) window 900 according to some embodiments described herein is shown. The chat window 900 may be rendered (or displayed) by any suitable computing device, system, or node, such as a desktop PC, mobile electronic device (e.g., mobile/smart phone), tablet, etc. In some embodiments, the chat window 900 is associated with text messaging or a messaging application. However, as described above, it should be understood that the methods and system described herein may be applied to any multiple party communications, including emails, web browser messaging extensions, etc., as well as audio and/or video messaging systems.

Still referring to FIG. 9, near a top of the window 900, an information panel 902 is shown. The information panel 902 may be used to render information related to the chat (or communication group), such as name (or description) 904 of the communication group. In the depicted embodiment, a message panel 906 is positioned below the information panel 904. As shown in FIG. 9, within the message panel 906, messages 908-928 are shown. It should be understood that message 908-928 shown in FIG. 9 may represent a series of messages received by the respective messaging system and rendered on a device of one of the users (e.g., USER1-USER5) within the group communication session. As an example, it may be assumed that window 900 is being rendered on a computing device or node associated with (e.g., belonging or registered to) USER1. In some embodiments, the messages 908-928 are shown in the order in which they were generated and/or received, with the earliest messages being displayed at the top of the message panel 906 (e.g., message 908 was received/generated first, and message 928 was received/generated last).

As depicted in FIG. 9, the messages 908-928 include all of the messages received by the group communication system. That is, the reduced topic functionality described herein has not been enabled. As such, it should be noted that messages 908, 910, 912, 914, 918, 920, 924, and 926 are associated with the topic related to a particular event (e.g., a New Year's Eve party), while messages 916, 922, and 928 are not related to the event (e.g., messages 916, 922, and 928 are associated with a joke being told in the group chat). As described above, as messages 916, 922, and 928 are not related to the primary topic of discussion (e.g., the party), they may be considered to be distracting for some users (e.g., USER1).

Figure 10:

FIG. 10 illustrates the chat window 900 with the reduced (e.g., single) topic functionality described herein enabled. The reduced topic functionality may be manually enabled by the user (e.g., the user "clicking" on a message associated with the desired topic) or automatically enabled by the system, as described above.

As such, it should be noted that in the depicted embodiment, messages 908, 910, 912, 914, 918, 920, 924, and 926 are (still) displayed within the message panel 906 and messages 916, 922, and 928 are not visible (or rendered). As such, only the messages associated with the selected topic (e.g., the party) have been rendered, and the other messages (e.g., not associated with the selected topic) have not been rendered. Additionally, new messages 930, 932, and 934, which are associated with the selected topic, are now shown. In some embodiments, rather than filter or prevent the messages that are not associated with the selected topic(s) from being rendered, such messages may be rendered in a manner different from the messages that are associated with the selected topic(s). For example, the messages that are not associated with the selected topic(s) may be displayed in a different color or brightness (e.g., "greyed out") or rendered with a line therethrough (e.g., in "strikethrough" font), or the rendering thereof may be delayed until a later time (i.e., thereby rendering such messages in a delayed manner, as opposed to rendering the messages that are associated with the selected topic(s) in an immediate manner when they are received).

In some embodiments, an indication is provided to notify the user that the reduced topic functionality has been enabled. In particular, in FIG. 10, within the information panel 902, a reduced topic indicator 936 (e.g., #newyearsparty) is displayed below the name 904 of the group chat. As such, in some embodiments, the reduced topic indicator 936 may not only indicate that such functionality has been enabled, but also describe the selected topic(s).

Still referring to FIG. 10, in some embodiments, after the reduced topic functionality is enabled, an indication is provided to notify the user that new/additional topics that may be of interest to the user are being discussed in the communication group (e.g., but those messages are not being rendered by the user's device/node because of the reduced topic functionality). In particular, in FIG. 10, within the information panel 902, a new topic indicator 938 is displayed below the name 904 of the group chat. As with the reduced topic indicator 936, in some embodiments, the new topic indicator 938 may not only indicate that a new topic is being discussed in the group, but also describe the new topic(s) (e.g., #waterleak). Also, in some embodiments, the new topic indicator 938 includes a message count 940 that provides an indication of the number of messages (e.g., 15) associated with the new topic(s). In some embodiments, the user may be provided with the ability disable the reduced topic functionality with respect to the newly detected topics (and/or the messages associated therewith). For example, in the example shown in FIG. 10, the user may "click" the new topic indicator 938 (e.g., using a finger, stylus, cursor, mouse, etc.), which may then result in the messages associated with the new topic(s) being rendered in the message panel 906.

Figure 11:
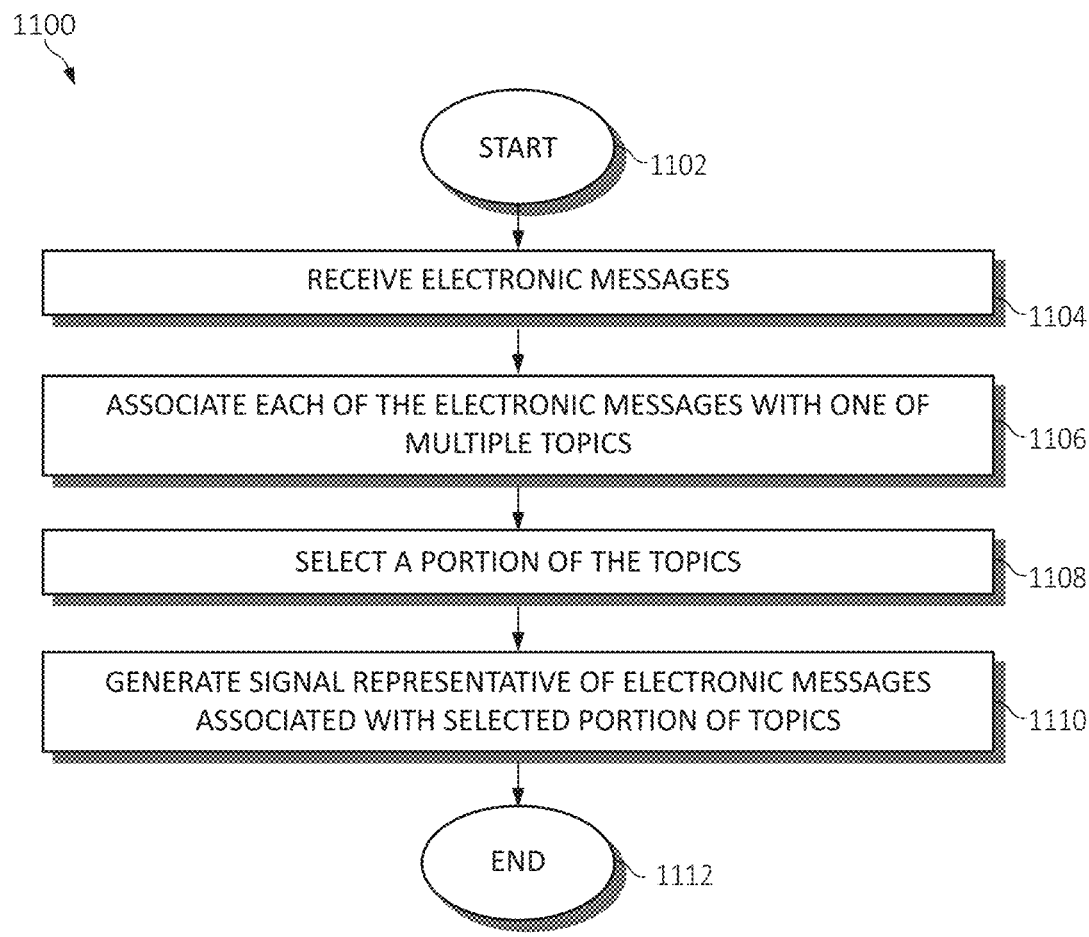
FIG. 11 is a flowchart diagram depicting an exemplary method for managing electronic communications according to an embodiment of the present invention.

Turning to FIG. 11, a flowchart diagram of an exemplary method 1100 for managing electronic communications is illustrated. Method 1100 begins (step 1002) with, for example, a multiple party communication session being initiated, such as a group text, messaging application session with multiple users, email chain, etc.

A plurality of electronic messages are received (step 1104). As described above, the electronic messages may be text messages, messages sent through a messaging application, emails, etc.

Each of the plurality of electronic messages is associated with a respective one of a plurality of topics (step 1106). That is, the received messages may be categorized based on the topic(s) they are related to. In some embodiments, a cognitive analysis is used to determine the topic(s) associated with the messages.

A portion of the plurality of topics is selected (step 1108). In some embodiments, the selected topic(s) (e.g., one topic) is chosen by user selection and/or performed in response to the receiving of an indication from the user. For example, the user may provide an indication of a desire to filter the electronic messages (e.g., based on a particular topic). However, as described above, a cognitive analysis may be used to automatically select the topic(s), such as based on a cognitive profile of the user (e.g., based on data sources associated with the user), previous actions by the user, etc.

A signal representative of the plurality of electronic messages that are associated with the selected portion of the plurality of topics is generated (step 1110). In some embodiments, the signal is used to affect the rendering of the electronic messages. For example, in some embodiments, only those of the plurality of the electronic messages that are associated with the selected portion of the plurality of topics are rendered. However, in some embodiments, all of the electronic messages may be caused to be rendered, however, the electronic messages that are associated with the selected portion of the plurality of topics are rendered in a manner different than the others of the plurality of electronic messages (i.e., those that are not associated with the selected portion of the plurality of topics). In some embodiments, a list of at least some of the plurality of topics is rendered.

Methods 1100 ends (step 1112) with, for example, the cessation of messages associated with the selected topic(s) being received. In some embodiments, when no more messages related to the selected topic(s) are received, the other messages (i.e., those not related to the selected topic(s)) may be rendered.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instruction.

The invention claimed is:

1. A method, by one or more processors, for managing electronic communications comprising:
   receiving a plurality of electronic messages from a plurality of users into a multiple party communication group;
   as each of the plurality of electronic messages is received into the multiple party communication group, associating each of the plurality of electronic messages with a respective one of a plurality of topics;
   selecting a portion of the plurality of topics based on at least one data source associated with one of the plurality of users; and
   generating a signal representative of the plurality of electronic messages that are associated with the selected portion of the plurality of topics based on the at least one data source associated with the one of the plurality of users, wherein generating the signal comprises:
   responsive to enabling a reduced topic mode through user input on an interface of a device utilized by a user of the plurality of users in the multiple party communication group, rendering only those of the plurality of electronic messages that are associated with the selected portion of the plurality of topics within a window of the interface displaying the plurality of electronic messages transacted between the plurality of users in the multiple party communication group notwithstanding all of the plurality of electronic messages are received by the device, such that others of the plurality of electronic messages are withheld from display within the window, wherein when the reduced topic mode is enabled, a new topic indicator is displayed within the window of the interface upon detecting that new electronic messages have been received into the multiple party communication group which are associated with a new topic not previously identified prior to enabling the reduced topic mode, and wherein the new topic indicator is inclusive of a message count indicative of a number of the new electronic messages associated with the new topic; and
   responsive to disabling the reduced topic mode on through the user input on the interface of the device by the user, rendering each of the plurality of electronic messages transacted between the plurality of users in the multiple party communication group within the window of the interface.

2. The method of claim 1, further comprising causing a list of at least some of the plurality of topics to be rendered.

3. The method of claim 1, wherein the selected portion of the plurality of topics includes only one of the plurality of topics.

4. A system for managing electronic communications comprising:
   at least one processor that
   receives a plurality of electronic messages from a plurality of users into a multiple party communication group;
   as each of the plurality of electronic messages is received into the multiple party communication group, associates each of the plurality of electronic messages with a respective one of a plurality of topics;
   selects a portion of the plurality of topics based on at least one data source associated with one of the plurality of users; and
   generates a signal representative of the plurality of electronic messages that are associated with the selected portion of the plurality of topics based on the at least one data source associated with the one of the plurality of users, wherein generating the signal comprises:
   responsive to enabling a reduced topic mode through user input on an interface of a device utilized by a user of the plurality of users in the multiple party communication group, rendering only those of the plurality of electronic messages that are associated with the selected portion of the plurality of topics within a window of the interface displaying the plurality of electronic messages transacted between the plurality of users in the multiple party communication group notwithstanding all of the plurality of electronic messages are received by the device, such that others of the plurality of electronic messages are withheld from display within the window, wherein when the reduced topic mode is enabled, a new topic indicator is displayed within the window of the interface upon detecting that new electronic messages have been received into the multiple party communication group which are associated with a new topic not previously identified prior to enabling the reduced topic mode, and wherein the new topic indicator is inclusive of a message count indicative of a number of the new electronic messages associated with the new topic; and responsive to disabling the reduced topic mode on through the user input on the interface of the device by the user, rendering each of the plurality of electronic messages transacted between the plurality of users in the multiple party communication group within the window of the interface.

5. The system of claim 4, wherein the at least one processor further causes a list of at least some of the plurality of topics to be rendered.

6. The system of claim 4, wherein the selected portion of the plurality of topics includes only one of the plurality of topics.

7. A non-transitory computer-readable storage medium having computer-readable program code portions stored therein for managing electronic communications by one or more processors, the computer-readable program code portions comprising:

an executable portion that receives a plurality of electronic messages from a plurality of users into a multiple party communication group;

an executable portion that, as each of the plurality of electronic messages is received into the multiple party communication group, associates each of the plurality of electronic messages with a respective one of a plurality of topics;

an executable portion that selects a portion of the plurality of topics based on at least one data source associated with one of the plurality of users; and an executable portion that generates a signal representative of the plurality of electronic messages that are associated with the selected portion of the plurality of topics based on the at least one data source associated with the one of the plurality of users, wherein generating the signal comprises:

responsive to enabling a reduced topic mode through user input on an interface of a device utilized by a user of the plurality of users in the multiple party communication group, rendering only those of the plurality of electronic messages that are associated with the selected portion of the plurality of topics within a window of the interface displaying the plurality of electronic messages transacted between the plurality of users in the multiple party communication group notwithstanding all of the plurality of electronic messages are received by the device, such that others of the plurality of electronic messages are withheld from display within the window, wherein when the reduced topic mode is enabled, a new topic indicator is displayed within the window of the interface upon detecting that new electronic messages have been received into the multiple party communication group which are associated with a new topic not previously identified prior to enabling the reduced topic mode, and wherein the new topic indicator is inclusive of a message count indicative of a number of the new electronic messages associated with the new topic; and responsive to disabling the reduced topic mode on through the user input on the interface of the device by the user, rendering each of the plurality of electronic messages transacted between the plurality of users in the multiple party communication group within the window of the interface.

8. The non-transitory computer-readable storage medium of claim 7, wherein the computer-readable program code portions further include an executable portion that causes a list of at least some of the plurality of topics to be rendered.

9. The non-transitory computer-readable storage medium of claim 7, wherein the selected portion of the plurality of topics includes only one of the plurality of topics.

* * * * *